April 13, 1937.  R. D. MATTESON ET AL  2,076,660
AIR CONDITIONING APPARATUS
Filed Nov. 18, 1935  2 Sheets-Sheet 1
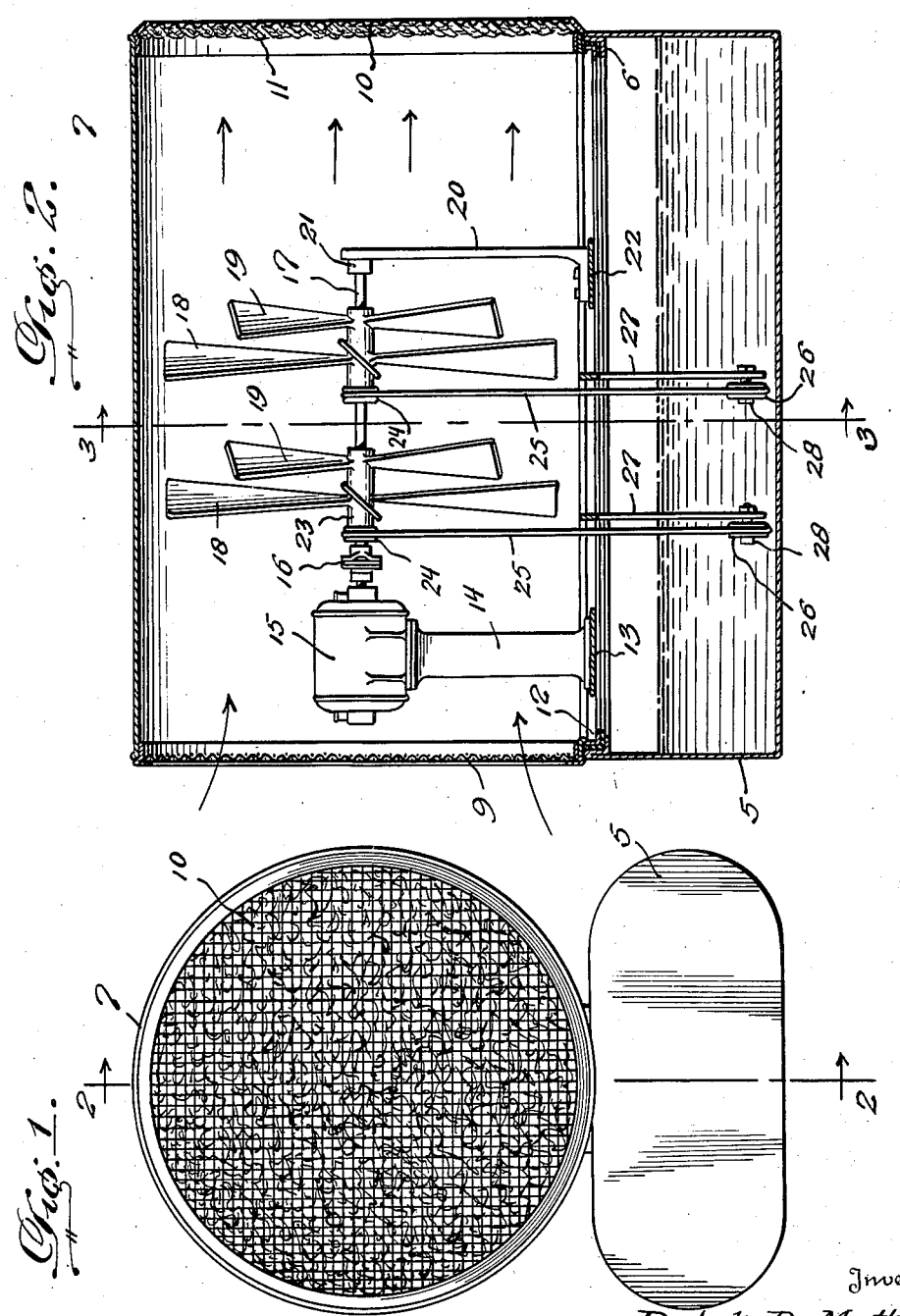
Inventors
Ralph D. Matteson,
William B. Thomas,
By J. Stanley Burch
Attorney April 13, 1937.    R. D. MATTESON ET AL    2,076,660
AIR CONDITIONING APPARATUS
Filed Nov. 18, 1935    2 Sheets-Sheet 2
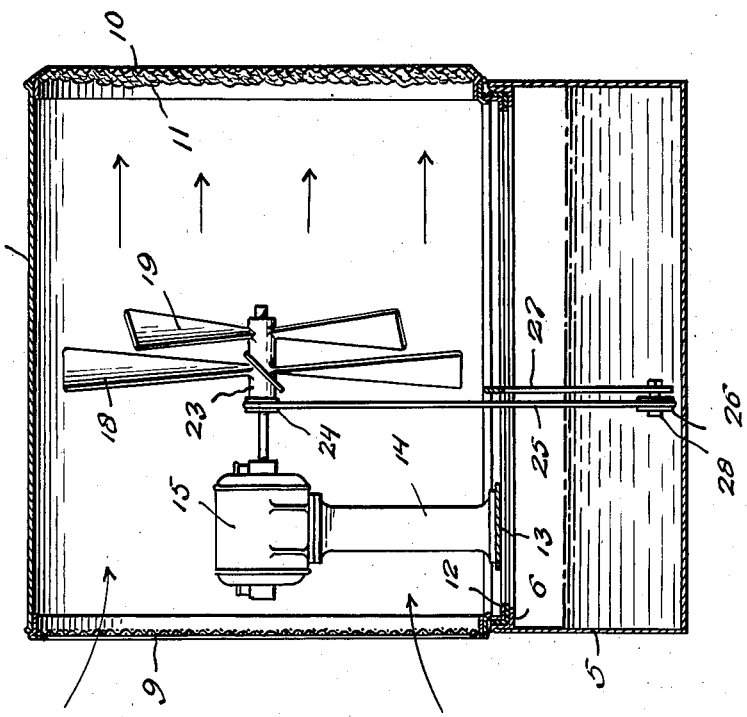
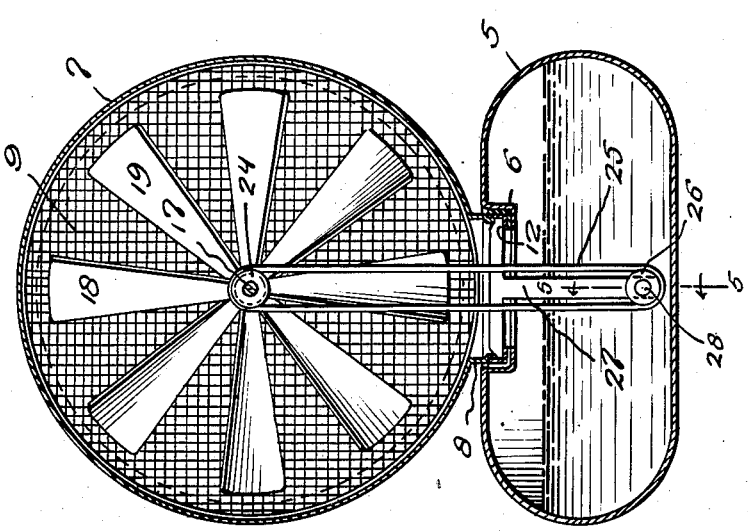
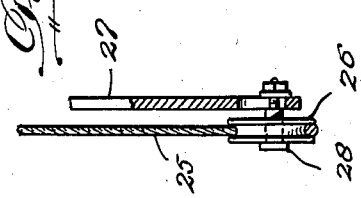
Inventors
Ralph D. Matteson,
William B. Thomas,
By J. Stanley Burch
Attorney Patented Apr. 13, 1937

2,076,660

UNITED STATES PATENT OFFICE 2,076,660

AIR CONDITIONING APPARATUS

Ralph D. Matteson, Boise, and William B. Thomas, Parma, Idaho

Application November 18, 1935, Serial No. 50,438

2 Claims. (Cl. 261—92)

This invention relates to an improved air conditioning apparatus adapted for moistening and cooling the air in or supplied to rooms or other enclosures.

The primary object of the present invention is to provide an air conditioning apparatus of the above kind which is very simple and durable in construction, inexpensive to manufacture, and efficient in operation.

Another object of the present invention is to provide an improved air conditioning apparatus of the above kind having simple and efficient means for elevating water from a bottom water pan or receptacle into an upper horizontal open-ended casing, and means for causing a rapid flow of air through the casing and for breaking the water up into fine particles and centrifugally throwing it in all directions outwardly against the walls of the open-ended casing, so as to thoroughly cool and humidify the air flowing through such open-ended casing.

Other objects and features of the present invention will become apparent from the following description when considered in connection with the accompanying drawings, in which:

Figure 1 is an end elevational view of an air conditioning apparatus embodying the present invention.

Figure 2 is a central longitudinal sectional view thereof taken on line 2—2 of Figure 1.

Figure 3 is a transverse section on line 3—3 of Figure 2.

Figure 4 is a view somewhat similar to Figure 2 of a modified form of the invention; and Figure 5 is an enlarged fragmentary section on line 5—5 of Figure 3, with the bottom water pan or receptacle omitted.

Referring more in detail to the drawings, the present invention includes a shallow elongated water pan or receptacle 5 having a laterally restricted central longitudinal top opening, and provided along the sides and ends of this opening with a depending angular flange 6. Suitably mounted upon the bottom water pan or receptacle 5 is another horizontal open-ended casing 7 having a bottom longitudinal opening registered with the top opening of water pan or receptacle 5. The casing 7 is preferably of cylindrical form, and is provided along the sides and ends of its bottom opening with a flange 8 projecting into the top opening of water pan or receptacle 5, so that any excess moisture which finds its way onto the walls of casing 7 will ultimately drain back into the water pan or receptacle 5 for re-use. The casing 7 is provided at its intake end with a foraminous covering preferably in the form of a removable screen 9. At its discharge end, the casing 7 is provided with another foraminous covering in the form of a removable screen 10 whose foraminous wall is lined with a layer of metal wool 11. This layer of metal wool 11 acts to extract excess moisture from the air as it is discharged from the casing 7, particularly excess moisture in the nature of unduly large size or quantity in the nature of droplets. This excess moisture, being extracted from the air at the inner side of the screen 10, will ultimately drain back into the water pan or receptacle 5.

Seated on the angular depending flange 6 of the water pan or receptacle 5, is an elongated rectangular open frame 12, preferably constructed of angle iron. The side members or rails of this frame 12 are connected near one end of the frame by means of a plate-like cross piece 13 forming a support upon which rests the base 14 of an electric motor 15. In this way, the motor 15 is supported within the intake end of casing 7 with its power or armature shaft substantially coincident with the longitudinal axis of casing 7. The inner or forward end of the armature shaft of motor 15 is suitably coupled as at 16 with one end of a horizontal shaft 17, also arranged coincident with the longitudinal axis of casing 7 and provided with a plurality of fan blades 18 and 19. An air conditioning apparatus of relatively small capacity may be provided with a single set of blades arranged in two series as shown in Figure 4, or additional sets of blades may be provided for apparatus of greater capacity as suggested in Figure 2. Otherwise, both forms of the invention illustrated are similar. It will be noted that the fan blades of each set include a series at 18 and a series at 19 with those of one series staggered in relation to those of the other series. Also, the blades of one series may be of different size than those of the other series, the blades 19 being illustrated as shorter than the blades 18.

In the embodiment of Figure 2, it will be necessary to support the forward end of shaft 17, and for this purpose we provide an upright or standard 20 having a bearing 21 at its upper end in which the forward end of shaft 17 is journaled, the lower end of standard 20 being secured to a plate-like cross piece 22 secured upon and connecting the side rails of the frame 12. Each set of fan blades is carried by a hub 23, and the end of this hub at the intake side of the blade is provided with a pulley 24 around which passes an endless belt 25. Belt 25 extends downwardly through the bottom opening of casing 7 and the top opening of fan or receptacle 5 where it also passes around another idler pulley 26 mounted within and near the bottom of water receptacle or pan 5. The mounting for each idler pulley 26 includes a T-shape support 27 whose cross member is secured upon and connects the side rails of frame 12, the intermediate member or leg of said T-shape support depending into the pan or receptacle 5 and provided at its lower end with a spindle 28 on which the pulley 26 is journaled. As indicated more clearly in Figure 5, the spindle 28 is vertically adjustable so as to properly tension the associated belt 25.

In operation, the motor 15 is suitably rendered operative so as to rotatably drive the fan blades 18 and 19 and cause travel of belt or belts 25. The traveling belt or belts 25 move through the water in the bottom pan or receptacle 5 so as to take up some of such water and elevate it into the upper open-ended casing 7. As the fan blades 18 and 19 revolve rapidly, they cause a rapid flow of air through the casing 7 and also draw the water from the belt or belts 25 and break the same up into a fine spray as well as centrifugally throwing the same outwardly against the walls of the casing 7. This simple moistening and cooling of air is had by a single operation in the device of Figure 4 and is repeated by the second set of fan blades in the construction of Figure 2. Obviously, where still greater capacity is desired, more than two sets of blades may be provided. The air flowing through the casing 7 will of course contact the film of water which accumulates on the walls of casing 7, so that additional moistening and cooling of the air will be provided in that way. However, excess water accumulating on the walls of casing 7 will ultimately drain down the latter and back into the water receptacle or pan 5 through the bottom opening of casing 7 and the top opening of said pan or receptacle 5.

In practice, apparatus constructed in accordance with the present invention has been found to operate with great efficiency. It will be seen that the fan blades form a dual function in causing flow of air through the casing 7 and breaking up and spraying the water elevated by the belt 25.

Minor changes in certain details of the invention illustrated and described, are contemplated within the spirit and scope of the invention as claimed.

What we claim as new is:

1. An air conditioning apparatus comprising a water pan or receptacle having a top opening and provided along the sides of said top opening with a depending angular flange, an open frame resting upon said angular flange, a cross member connecting the sides of said frame, a motor, said cross member having a depending arm, an idler pulley carried by the lower end of said depending arm within and near the bottom of said water pan, a horizontal open-ended casing removably mounted upon said water pan and having a bottom opening registered with the top opening of said water pan, a shaft arranged coincident with the longitudinal axis of said casing and operatively connected to said motor, a pulley rotatable with said shaft, a belt passing around said pulleys for elevating water from the water pan into said casing, and fan blades carried by said shaft for forcing air through the casing and drawing the water from the belt so as to break up such water and centrifugally throw the same outwardly against the walls of the casing in the path of the air flowing through the latter.

2. An air conditioning apparatus comprising a water pan or receptacle having a laterally restricted central longitudinal top opening and provided along the sides of said top opening with a depending angular flange, an open-ended casing removably mounted upon said water pan and provided with a bottom opening registered with the top opening of the water pan so that excess moisture may drain by gravity from said casing back into said water pan, said casing having depending flanges along the sides of said bottom opening thereof fitting in the top opening of said water pan, a shaft arranged in and concentric with the longitudinal axis of said casing, a belt driven by said shaft for elevating water from said water pan into said casing, fan blades carried by said shaft for forcing air through the casing and drawing the water from the belt so as to break up the same and throw it outwardly against the sides of said casing, a motor mounted in the casing and operatively connected to said shaft for rotatably driving the latter, a frame mounted on the depending flange of the water pan, and a T-shape support having a cross member connecting the sides of said frame and a depending member carrying an idler pulley at its lower end within and below the water level of said water pan, said belt passing around said idler pulley.

RALPH D. MATTESON.
WILLIAM B. THOMAS.